United States Patent Office 3,776,921
Patented Dec. 4, 1973

3,776,921
HYDANTOIN ACYL HALIDES AND THEIR USE
AS INSECTICIDES
Gophal H. Singhal, Westfield, N.J., and Joseph H. Lesser,
Woodside, N.Y., assignors to Esso Research and Engineering Company
No Drawing. Original application Apr. 23, 1970, Ser. No. 31,405, now abandoned. Divided and this application Dec. 17, 1971, Ser. No. 209,449
Int. Cl. C07d 49/32; C07f 9/08
U.S. Cl. 260—309.5                                                      6 Claims

ABSTRACT OF THE DISCLOSURE

Acyl hydantoin derivatives defined by the following structural formula:

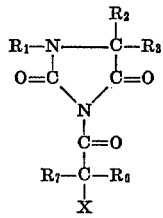

wherein $R_1$ is one selected from the group consisting of $C_1$–$C_6$ lower alkyl optionally substituted by chlorine, bromine, $C_1$–$C_6$ alkoxy and $C_1$–$C_6$ alkylthio; $C_3$–$C_6$ alkenyl; $C_3$–$C_6$ alkynyl; $C_3$–$C_8$ cycloalkyl; or phenyl optionally substituted with chlorine, bromine, trifluoromethyl or $NO_2$. $R_2$ and $R_3$ can be the same or different and either one is selected from the group consisting of hydrogen, $C_1$–$C_4$ alkyl, $C_1$–$C_4$ chloroalkyl, phenyl optionally substituted with chlorine or nitro and $C_1$–$C_4$ alkoxy. X is one selected from the group consisting of chlorine, bromine, fluorine and a moiety defined by

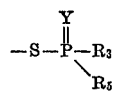

wherein Y can be either O or S and $R_4$ and $R_5$ can be the same or different and selected from the group consisting of $C_1$–$C_6$ alkoxy, $C_1$–$C_6$ alkyl, $C_1$–$C_6$ alkylthio, phenyl optionally substituted with chlorine or bromine, phenoxy optionally substituted with chlorine or bromine; $R_6$ and $R_7$ can be the same or different and can be selected from the group consisting of hydrogen, and $C_1$–$C_6$ alkyl.

Organic compounds represented by this structure have been found to have pesticidal, particularly insecticidal, activity.

Compounds represented by the following structure:

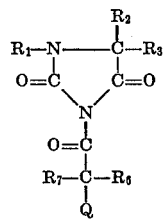

have been found to possess post-emergence herbicidal activity. In this structure, $R_1$, $R_2$, $R_3$, $R_7$ and $R_6$ are defined as hereinabove, and Q is one selected from the group consisting of chlorine, bromine and fluorine.

This is a division of application Ser. No. 31,405 filed Apr. 23, 1970 now abandoned.

This invention relates to novel derivatives of hydantoins. In one aspect, this invention relates to the 1-acylphosphoryl derivative of hydantoins and their use as an insecticide. In another aspect, this invention relates to the 1-halo-acyl-hydantoin derivatives and their use as post-emergence herbicides.

Acyl hydantoin derivatives of this invention are characterized by the following structural formula:

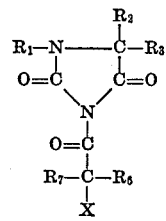

wherein $R_1$ is one selected from the group consisting of $C_1$–$C_6$ lower alkyl optionally substituted by chlorine, bromine, $C_1$–$C_6$ alkoxy and $C_1$–$C_6$ alkylthio; $C_3$–$C_6$ alkenyl; $C_3$–$C_6$ alkynyl; $C_3$–$C_8$ cycloalkyl; phenyl optionally substituted with chlorine, trifluoromethyl, bromine or $NO_2$; $R_2$ and $R_3$ can be the same or different and either one is selected from the group consisting of hydrogen, $C_1$–$C_4$ alkyl, $C_1$–$C_4$ chloroalkyl, phenyl optionally substituted by chlorine or nitro and $C_1$–$C_4$ alkoxy. X is one selected from the group consisting of chlorine, bromine, fluorine and a group defined by

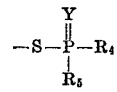

wherein Y can be either O or S and $R_4$ and $R_5$ can be the same or different and selected from the group consisting of $C_1$–$C_6$ alkoxy, $C_1$–$C_6$ alkyl, $S_1$–$C_6$ alkylthio, phenyl optionally substituted with chlorine or bromine, phenoxy, optionally substituted with chlorine or bromine, and $R_6$ and $R_7$ can be the same or different and can be selected from the group consisting of hydrogen, and $C_1$–$C_6$ alkyl.

The acyl hydantoin derivatives corresponding to the following structure:

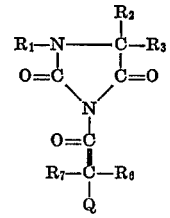

wherein $R_1$, $R_2$, $R_3$, $R_6$ and $R_7$ are as defined hereinabove and Q is either chlorine, bromine, or fluorine have been found to be effective herbicides.

Specific examples of compounds having the above compound structure are listed hereinbelow.

Compound No.:

1—3-chloroacetyl-2-methylhydantoin
2—3-bromoacetyl-1-methylhydantoin
3—3-chloroacetyl-1-(p-chlorophenyl)-hydantoin
4—3-chloroacetyl-1-(3,4-dichlorophenyl)-hydantoin
5—3-chloroacetyl-1-(2,4-dichlorophenyl)-hydantoin
6—3-chloroacetyl-1-(2,4-dinitrophenyl)-hydantoin
7—3-chloroacetyl-1-nitro-hydantoin
8—3-chloroacetyl-allyl-hydantoin
9—3-chloroacetyl-1-($\beta$-methoxyethyl)-hydantoin
10—3-bromoacetyl-1-nitro-hydantoin
11—3-chloroacetyl-1-trichloromethyl-hydantoin
12—3-(2-chloropropionyl)-1-methyl-hydantoin
13—3-(2-chloro-2-methyl-propionyl)-1-methyl-hydantoin
14—3-chloroacetyl-1,5,5-trimethyl-hydantoin Compound No.:
15—3-chloroacetyl-1-methyl-5,5-diphenyl-hydantoin
16—3-chloroacetyl-1-methyl-5-benzylidene-hydantoin
17—S-[(1-methylhydantoinyl)-3-acetyl]-O,O-dimethyl monothiophosphate
18—S-[(1-methylhydantoinyl)-3-acetyl]-O,O-diethyl monothiophosphate
19—S-[(1-methylhydantoinyl)-3-acetyl]-O,O-dimethyl dithiophosphate
20—S-[(1-methylhydantoinyl)-3-acetyl]-O,O-diethyl dithiophosphate
21—S-[(1-methylhydantoinyl)-3-acetyl]-O-ethyl-s-n-propyl dithiophosphate
22—S-[(1-methoxyethylhydantoinyl)-3-acetyl]-O,O-dimethyl monothiophosphate
23—S-[(1-allylhydontoinyl)-3-acetyl]-O,O-dimethyl monothiophosphate
24—S-[(1-nitrohydantoinyl)-3-acetyl]-O,O-dimethyl monothiophosphate
25—[(1-methylhydantoinyl)-3-acetyl]-O,O-dimethyl monothiophosphate The foregoing compounds can be readily prepared by the following method:

STEP I

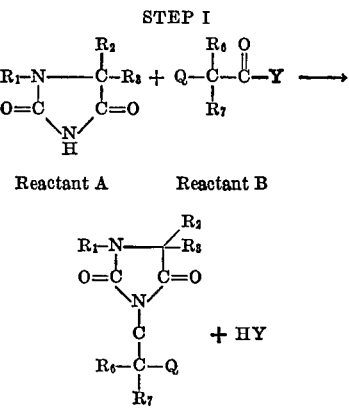

Reactant A        Reactant B wherein $R_1$, $R_2$, $R_3$, $R_6$, $R_7$, and X are the same as defined hereinbefore and Y is either Cl or

The substituted hydantoins (Reactant A) can be prepared according to the methods described in "Chemical Reviews," vol. 45, June 1950, pp. 403–407.

This reaction can be carried out at temperatures ranging from 25–175° C., preferably 25–130° C., under pressures ranging from 1 to 10 atmospheres, preferably atmospheric pressures, in the presence of a solvent selected from the group consisting of benzene, toluene, xylene, dimethylformamide, dimethylsulfoxide at a mole ratio of A/B ranging from 1:1 to 1:20, preferably 1:2. The preferred solvent is toluene.

STEP II

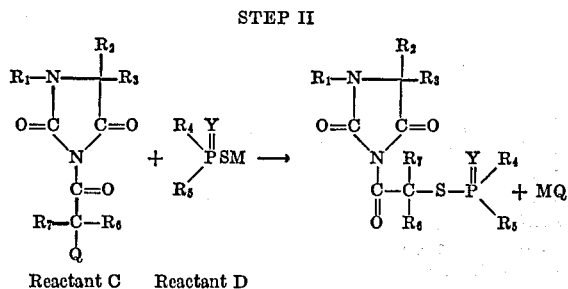

Reactant C        Reactant D

M is either K, Na or $NH_4$ and Y, $R_4$ and $R_5$ are as defined hereinabove.

This reaction can be carried out at temperatures ranging from 0–175° C., preferably 25–80° C., under ambient pressure in the presence of a solvent selected from the group consisting of ether, acentonitrile, benzene, toluene at a mole ratio of C/D ranging from 1:1 to 1:20, preferably 1:1. The preferred solvent is acetonitrile.

The compounds of this invention have general pesticidal properties. They are useful as insecticides and, as stated hereinabove, the halogen derivatives have been found to have post-emergence herbicidal and insecticidal activity.

The compounds of the invention have general herbicidal and insecticidal properties. They are especially useful in certain types of weed control such as, for example, in application to crop lands to give control of the common weeds, without harming the crop plants; and for the control of crabgrass in lawns.

Herbicidal and insecticidal compositions of the invention are prepared by admixing one or more of the active ingredients defined heretofore, in herbicidally and insecticidally effective amounts with a conditioning agent of the kind used and referred to in the art as a pest control adjuvant or modifier to provide formulations adapted for ready and efficient application to soil or weeds (i.e., unwanted plants) or for overall pesticidal application using conventional applicator equipment.

Thus, the herbicidal and insecticidal compositions or formulations are prepared in the form of solids or liquids. Solid compositions are preferably in the form of granulars or dusts.

The compositions can be compounded to give homogeneous free-flowing dusts by admixing the active compound or compounds with finely divided solids preferably talc, natural clays, pyrophyllite, diatomaceous earth, or flours such as walnut shell, wheat, redwood, soya bean, and cottonseed flours. Other inert solid conditioning agents or carriers of the kind conventionally employed in preparing pest control compositions in powdered form can be used.

Granulars can be compounded by absorbing the compound in liquid form onto a preformed granular diluent. Such diluents as natural clays, pyrophyllite, diatomaceous earth, flours such as walnut shell, as well as granular sand can be employed.

In addition, granulars can also be compounded by admixing the active ingredient with one of the powdered diluents described hereinabove, followed by the step of either pelleting or extruding the mixture.

Liquid compositions of the invention are prepared in the usual way by admixing one or more of the active ingredients with a suitable liquid diluent medium. In the cases where the compounds are liquids, they may be sprayed in ultra low volume as such. With certain solvents, such as alkylated naphthalene or other aromatic petroleum solvents, dimethyl formamide, cycloketone, relatively high up to about 50% by weight or more concentration of the active ingredient can be obtained in solution.

The herbicidal and insecticidal compositions of the invention whether in the form of dusts or liquids, preferably also include a surface-active agent sometimes referred to in the art as a wetting, dispersing, or emulsifying agent. These agents, which will be referred to hereinafter more simply as surface-active dispersing agents, cause the compositions to be easily dispersed in water to give aqueous sprays which, for the most part, constitute a desirable composition for application.

The surface-active dispersing agents employed can be of the anionic, cationic, or nonionic type and include, for example, sodium and potassium oleate, the amine salts of oleic acid, such as morpholine and dimethylamine oleates, the sulfonated animal and vegetable oils, such as sulfonated fish castor oils, sulfonated petroleum oils, sulfonated acyclic hydrocarbons, sodium salt of lignin sulfonic acid (gaulac), alkylnaphthalene sodium sulfonate, sodium salts of sulfonated condensation products of naphthalene and formaldehyde, sodium lauryl sulfate, disodium monolauryl phosphate, sorbitol laurate, pentaerythritol monostearate, glycerol monostearate, diglycol oleate, polyethylene oxides, ethylene oxide condensation products with stearyl alcohol and alkylphenol, polyvinyl alcohols, salts, such as the acetate of polyamines from reductive amination of ethylene/carbon monoxide polymers, laurylamine hydrochloride, laurylpyridinium bromide, stearyl trimethylammonium bromide, cetyldimethylbenzyl ammonium chloride, lauryldimethylamine oxide, and the like. Generally, the surface-active agent will not comprise more than about 5 to 15% by weight of the composition, and in certain compositions the percentage will be 1% or less. Usually, the minimum lower concentration will be 0.1%.

The herbicidal and insecticidal compositions are applied either as a spray, granular or a dust to the locus or area to be protected from undesirable plant growth, commonly called weeds, i.e. plants growing where they are not wanted. Such application can be made directly upon the locus or area and the weeds thereon during the period of weed infestation in order to destroy the weeds, but preferably, the application is made in advance of an anticipated weed infestation to prevent such infestation. Thus, the compositions can be applied as aqueous foliar sprays but can also be applied as sprays directly to the surface of the soil. Alternatively, the dry powdered compositions can be dusted directly on the plants or on the soil.

In applying the herbicidal and insecticidal compositions of the invention for selective weed control as in the control of weeds in cotton or cornfields, the compositions are preferably applied after planting of the crop seeds but before emergence of the seedlings. In other words, the applications are of the pre-emergence type.

The active compound is, of course, applied in an amount sufficient to exert the desired herbicidal action. The amount of the active compound present in the compositions as actually applied for destroying or preventing weeds will vary with the manner of application, the particular weeds for which control is sought, the purpose for which the application is being made, and like variables. In general, the herbicidal and insecticidal compositions as applied in the form of a spray, dust or granular, will contain from about 0.1% to 100% by weight of the active compound.

Fertilizer materials, other herbicidal agents, and other pest control agents such as insecticides and fungicides can be included in the herbicidal and insecticidal compositions of the invention if desired.

The term "carrier" or "diluent" as used herein means a material, which can be inorganic or organic and synthetic or of natural origin, with which the active ingredient is mixed or formulated to facilitate its storage, transport, and handling and application to the plants to be treated. The carrier is preferably biologically and chemically inert and, as used, can be a solid or fluid. When solid carriers are used, they are preferably particulate, granular, or pelleted; however, other shapes and sizes of solid carrier can be employed as well. Such preferable solid carriers can be natural occurring minerals—although subsequently subjected to grinding, sieving, purification, and/or other treatments—including, for example, gypsum; tripolite; diatomaceous earth; mineral silicates such as mica, vermiculite, talc, and pyrophyllite; clays of the montmorillonite, kaolinite, or attapulgite groups; calcium or magnesium limes, or calcite and dolomite; etc. Carriers produced synthetically, as for example, synthetic hydrated silica oxides and synthetic calcium silicates can also be used, and many proprietary products of this type are available commercially. The carrier can also be an elemental substance such as sulfur or carbon, preferably an activated carbon. If the carrier possesses intrinsic catalytic activity such that it would decompose the active ingredient, it is advantageous to incorporate a stabilizing agent, as for example, polyglycols such as diethylene glycol, to neutralize this activity and thereby prevent possible decomposition of the derivatives of the present nitrated aryl compounds.

For some purposes, a resinous or waxy carrier can be used, preferably one which is solvent soluble or thermoplastic, including fusible materials. Examples of such carriers are natural or synthetic resins such as a coumarone resin, rosin, copal, shellac, dammar, polyvinyl chloride, styrene polymers and copolymers, a solid grade of polychlorophenol such as is available under the registered trademark "Arcolor," a bitumen, an asphaltite, a wax for example, beeswax or a mineral wax such as paraffin wax or montan wax, or a chlorinated mineral wax, or a microcrystalline wax such as those available under the registered trademark "Mikrovan Wax." Compositions comprising such resinous or waxy carriers are preferably in granular or pelleted form.

Fluid carriers can be liquids, as for example, water, or an organic fluid, including a liquefied normally vaporous or gaseous material, or a vaporous or gaseous material, and can be solvents or nonsolvents for the active material. For example, the horticultural petroleum spray oils boiling in the range of from about 275° to about 575° F., or boiling in the range of about 575° to about 1,000° F. and having an unsulfonatable residue of at least about 75% and preferably of at least about 90%, or mixtures of these two types of oil, are particularly suitable liquid carriers.

The carrier can be mixed or formulated with the active material during its manufacture or at any stage subsequently. The carrier can be mixed or formulated with the active material in any proportion depending on the nature of the carrier. One or more carriers, moreover, can be used in combination.

The compositions of this invention can be concentrates, suitable for storage or transport and containing, for example, from about 5 to about 90% by weight of the active ingredient, preferably from about 20 to about 80 wt. percent. These concentrates can be diluted with the same or different carrier to a concentration suitable for application. The compositions of this invention may also be dilute compositions suitable for application. In general, concentrations of about 0.1 to about 10% by weight, of active material based on the total weight of the composition are satisfactory, although lower and higher concentrations can be applied if necessary.

The compositions of this invention can also be formulated as dusts. These comprise an intimate admixture of the active ingredient and a finely powdered solid carrier such as aforedescribed. The powdered carriers can be oil-treated to improve adhesion to the surface to which they are applied. These dusts can be concentrates, in which case a highly sorptive carrier is preferably used. These require dilution with the same or a different finely powdered carrier, which can be of lower sorptive capacity, to a concentration suitable for application.

The compositions of the invention can be formulated as wettable powders comprising a major proportion of the active ingredient mixed with a dispersing, i.e. deflocculating or suspending agent, and if desired, a finely divided solid carrier and/or a wetting agent. The active ingredient can be in particulate form or adsorbed on the carrier and preferably constitutes at least about 10%, more preferably at least about 25%, by weight of the composition. The concentration of the dispersing agent should in general be between about 0.5 and about 5% by weight of the total composition, although larger or smaller amounts can be used if desired.

The dispersing agent used in the composition of this invention can be any substance having definite dispersing, i.e., deflocculating or suspending, properties as distinct from wetting properties, although these substances can also possess wetting properties as well.

The dispersant or dispersing agent used can be protective colloids such as gelatin, glue, casein, gums, or a synthetic polymeric material such as polyvinyl alcohol and methyl cellulose. Preferably, however, the dispersants or dispersing agents used are sodium or calcium salts of high molecular weight sulfonic acids, as for example, the sodium or calcium salts of lignin sulfonic acids derived from sulfite cellulose waste liquors. The calcium or sodium salts of condensed aryl sulfonic acid, for example, the products known as "Tamol 731," are also suitable.

The wetting agents used can be nonionic type surfactants, as for example, the condensation products of fatty acids containing at least 12, preferably 16 to 20, carbon atoms in the molecule, or abietic acid or naphthenic acid obtained in the refining of petroleum lubricating oil fractions with alkylene oxides such as ethylene oxide or propylene oxide, or with both ethylene oxide and propylene oxide, as for example, the condensation product of oleic acid and ethylene oxide containing about 6 to 15 ethylene oxide units in the molecule. Other nonionic wetting agents like polyalkylene oxide polymers, commercially known as "Pluronics" can be used. Partial esters of the above acids with polyhydric alcohols such as glycerol, polyglycerol, sorbitol, or mannitol can also be used.

Suitable anionic wetting agents include the alkali metal salts, preferably sodium salts, of sulfuric acid esters or sulfonic acids containing at least 10 carbon atoms in a molecule, for example, the sodium secondary alkyl sulfates, dialkyl sodium sulfosuccinate available under the registered trademark "Teepol," sodium salts of sulfonated castor oil, sodium dodecyl benzene sulfonate.

Granulated or pelleted compositions comprising a suitable carrier having the active ingredient incorporated therein are also included in this invention. These can be prepared by impregnating a granular carrier with a solution of the inert ingredient or by granulating a mixture of a finely divided solid carrier and the active ingredient. The carrier used can consist of or contain a fertilizer or fertilizer mixture, as for example, a superphosphate.

The compositions of this invention can also be formulated as solutions of the active ingredient in an organic solvent or mixture of solvents, such as for example, alcohols; ketones, especially acetone; ethers; hydrocarbons; etc.

Where the toxicant itself is a liquid these materials can be sprayed on crops or insects without further dilution.

Petroleum hydrocarbon fractions used as solvents should preferably have a flash point above 73° F., an example of this being a refined aromatic extract of kerosene. Auxiliary solvents such as alcohols, ketones, and polyalkylene glycol ethers and esters can be used in conjunction with these petroleum solvents.

Compositions of the present invention can also be formulated as emulsifiable concentrates which are concentrated solutions or dispersion of the active ingredient in an organic liquid, preferably a water-insoluble organic liquid, containing an added emulsifying agent. These concentrates can also contain a proportion of water, for example, up to about 50% by volume, based on the total composition, to facilitate subsequent dilution with water. Suitable organic liquids include, e.g., the above petroleum hydrocarbon fractions previously described.

The emulsifying agent can be of the type producing water-in-oil type emulsions which are suitable for application by low volume spraying, or an emulsifier of the type producing oil-in-water emulsions can be used, producing concentrates which can be diluted with relatively large volumes of water for application by high volume spraying or relatively small volumes of water for low volume spraying. In such emulsions, the active ingredient is preferably in a nonaqueous phase.

The present invention is further illustrated in greater detail by the following examples, but it is to be understood that the present invention in its broadest aspects, is not necessarily limited in terms of the reactants, or specific temperatures, residence times, separation techniques and other process conditions, etc.; or dosage level, exposure times, test plants used, etc. by which the compounds and/or compositions described and claimed are prepared and/or used.

EXAMPLE 1

Preparation of 3-chloroacetyl-1-methylhydantoin

A mixture of 46 g. (0.4 M) of 1-methyl hydantoin, 88 g. (0.8 M) chloroacetyl chloride, and 200 ml. of toluene were refluxed for 6 hrs. The volatiles were removed under reduced pressure leaving the crude product as a brown crystalline solid, wt. 68.6 g.

A sample was recrystallized from ether/methylene chloride for elemental analyses, M.P. 72–73°.

Found (percent): C, 38.14; H, 3.84; N, 14.77. Calculated (percent): C, 37.80; H, 3.70; N, 14.70.

EXAMPLE 2

Preparation of 1-t-butyl-3-chloroacetyl hydantoin

A mixture of 40.0 g. (0.26 M.) of 1-t-butyl hydantoin 66 g. (0.6 M) of chloroacetylchloride, and 250 ml. of toluene were refluxed for 4 hours. The clear brown reaction solution was then stripped, leaving 49 g. of brown crystalline solid.

An analytical sample was prepared by recrystallization from ether, M.P. 103–104.5.

*Analysis.*—Found (percent): C, 46.41; H, 5.60; N, 11.96. Calculated (percent): C, 48.53; H, 5.88; N, 12.50.

EXAMPLE 3

Preparation of 1-allyl-3-chloroacetyl hydantoin

A mixture of 70 g. (0.5 M) of 1-allyl hydantoin, 100 g. of chloroacetyl chloride, and 250 ml. of toluene were refluxed for 4 hours. The cool, pale yellow reaction solution contained a precipitate which was filtered, wt. 30.0 g., M.P. 84–6°. The remaining product was obtained by removing the volatiles under reduced pressure from the filtrate. This gave an additional 70.0 g. of product.

The structure was confirmed by NMR analysis.

EXAMPLE 4

Preparation of 3-chloroacetyl-1-(β-methoxyethyl) hydantoin

A mixture of 80 g. (0.5 M) of 1-β-methoxyethyl hydantoin and 100 g. of chloroacetyl chloride were refluxed in 250 ml. of toluene for 4 hours. From the clear brown reaction solution, volatiles were removed under reduced pressure to give 115.4 g. of brown crystalline solid.

The solid was shown to be about 75% pure product by NMR analysis.

EXAMPLE 5

Preparation of S-[1-methylhydantoinyl-3-acyl]-phosphorothioate

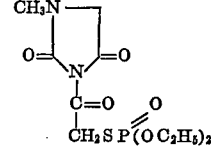

A mixture of 19.0 g. (0.1 M) of 1-methyl-3-chloroacetyl hydantoin, 19.0 g. (0.1 M) of S-ammonium-O,O'-diethoxy phosphorothioate, and 150 ml. of acetonitrile was refluxed for 1.5 hrs. The reaction mixture was filtered, stripped on a rotary evaporator (15 mm. Hg/40°), and the residue dissolved in 150 ml. of chloroform. The chloroform solution was washed with 50 ml. of cold water twice, twice with 50 ml. of 5% aqueous bicarbonate solution, and dried over anhydrous sodium sulfate. The chloroform solution was filtered and the volatiles removed on a rotary evaporator at 15 mm./50° and then under high vacuum (0.1 mm.) at 50° for 48 hrs.

The resulting clear brown oil was shown by NMR spectroscopy and elemental analysis, to be the desired phosphate, wt. 11.6 g.

*Elemental analysis.*—Calculated (percent): C, 37.03; H, 5.28; N, 9.55. Found (percent): C, 35.94; H, 5.50; N, 9.78.

EXAMPLE 6

Preparation of S-(1-methyl-3-hydantoinylacetyl)-O,O'-diethoxy phosphorodithioate

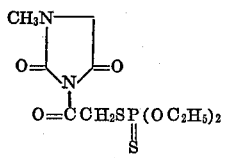

A mixture of 10 g. (0.05 M) of 3-chloroacetyl-1-methyl hydantoin, 10 g. (0.05 M) S-ammonium-O,O'-diethoxy phosphorodithioate, and 100 ml. of acetonitrile were refluxed for 2 hrs. The reaction mixture was allowed to cool to room temperature, filtered, stripped on a rotary evaporator (50°/15 mm. Hg), and then dissolved in 150 ml. chloroform. The chloroform solution was washed with 50 ml. 5% aqueous bicarbonate, 50 ml. of saturated NaCl solution, and then dried over sodium sulfate (anhydrous). The chloroform solution was filtered and the volatiles removed on a rotary evaporator first at 15 mm. Hg/50° and then for 18 hrs. at 50°/0.1 mm. Hg. The residue was a clear pale brown oil, wt. 14.4 g.

The structure of the product was confirmed by NMR and elemental analysis.

*Elemental analysis.*—Calculated (percent): C, 35.29; H, 5.03; N, 8.23. Found (percent): C, 35.42; H, 5.17; N, 8.08.

EXAMPLE 7

A number of phosphoric and thiophosphoric acid esters of 1-substituted hydantoins and 3-substituted hydantoins were prepared according to the procedures previously outlined in Examples 1 and 2. The compounds prepared are listed in Table I.

The present invention is further illustrated in greater detail by the following examples, but it is to be understood that the present invention, in its broadest aspects, is not necessarily limited in terms of the reactants, or specific temperatures, residence times, separation techniques and other process conditions, etc.; or dosage level, exposure times, test plants used, etc., by which the compounds and/or compositions described and claimed are prepared and/or used.

TABLE I.—HYDANTOINYL PHOSPHOROUS ESTERS

|  | Analysis (percent) | | | | | | | |
|---|---|---|---|---|---|---|---|---|
|  | Found | | | | Calculated | | | |
| Compound | C | H | N | P | C | H | N | P |
| $R^1=CH_3$ <br> $R^2=\underset{\underset{O}{\|\|}}{C}CH_2S\underset{\underset{O}{\|\|}}{P}\begin{smallmatrix}S(nC_3H_7)\\OC_2H_5\end{smallmatrix}$ | 37.04 | 5.50 | 7.65 | ----- | 37.28 | 5.40 | 7.90 | 8.74 |
| $R^1=CH_3$ <br> $R^2=(CH_3O)_2\underset{\underset{O}{\|\|}}{P}S CH_2\underset{\underset{O}{\|\|}}{C}-$ | Structure confirmed by NMR | | | | | | | |
| $R^1=(C_2H_5O)_2\underset{\underset{O}{\|\|}}{P}S CH_2\underset{\underset{O}{\|\|}}{C}-$ <br> $R^2=(CH_3)_2CH$ | 41.72 | 6.22 | 8.19 | ----- | 40.91 | 6.01 | 7.95 | ----- |
| $R^1=(C_2H_5O)_2\underset{\underset{S}{\|\|}}{P}S CH_2\underset{\underset{O}{\|\|}}{C}-$ <br> $R^2=(CH_3)_2CH$ | 36.63 | 5.82 | 7.67 | ----- | 39.12 | 5.74 | 7.60 | 8.40 |
| $R^1=(CH_3)_3C-$ <br> $R^2=(CH_3O)_2\underset{\underset{S}{\|\|}}{P}S CH_2CO$ | Structure confirmed by NMR | | | | | | | |

EXAMPLE 8

Representative derivatives of the haloacylated hydantoin compounds of this invention were evaluated for post-emergence activity. The test procedure was as follows:

Two flats containing six weeds whose first true leaves have appeared were sprayed at a rate of 10 lb./a. The flats were then held in the greenhouse and the response rated after 12–16 days. Response is rated on a 1–10 scale were 1=no injury and 10=complete kill.

Herbicidal testing of 1-methyl-3-chloroacetylhydantoin (post emergence)

|  | Weeds— | | | | | |
|---|---|---|---|---|---|---|
|  | MG | CG | BG | Fx | Zi | Mu |
| Concentration, 10 lbs./a | 7 | 10 | 9 | 10 | 9 | 10 |

NOTE.—Wherein: MG=Morning glory; CG=Crab grass; BG=Barnyard grass; Fx=Foxtail; Zi=Zinnia; Mu=Mustard.

EXAMPLE 9

Representative acylhydantoin derivations from those prepared in the previous examples were evaluated for their insecticidal activity.

The experimental compounds were tested as aqueous emulsions. These emulsions were prepared by dissolving the compound in acetone and dispersing it in distilled water with Triton X–100 an alkylaryl polyether alcohol derived by the reaction of 1-octylphenol with ethylene oxide to give spray emulsions containing the desired concentration of the compound. These emulsions were then used in standard laboratory tests described below.

Mexican bean beetle

Bean leaves were dipped in the emulsion of the test chemical and allowed to dry. The individually treated leaves were placed in Petri dishes and five Mexican bean beetle larvae introduced into each of the two replicate dishes.

Mite contact

Potted bean plants infested with two spotted spidermites were placed on a turntable and sprayed with a formulation of the test chemical. The plants were held for 7 days and the degree of mite control was rated after this period.

Mites systemic

Bean plants were treated by applying 20 milliliters of the formulated test chemical to the soil. The mites were transferred to the plants after 24 hours. The plants were held for 7 more days and the degree of mite control rated.

Aphid contact

Potted nasturtium plants infested with the bean aphids were placed on a turntable and sprayed with a formulation of the test chemical. The plants were held for two days and the degree of aphid control was rated.

Aphid systemic

Nasturtium plants are treated by applying 20 milliliters of the formulated test chemical to the soil. The mites were transferred to the plant after 24 hours. The plants were held for 48 additional hours and the degree of the aphid control rated.

Boll weevil

Five mixed sex adult boll weevils placed in a wire screen cage were sprayed with the proper concentration of formulated test chemical. The boll weevils were provided with succrose solution on a filter paper. The cages were held at about 70° F. for 24 hours and the percent mortality read after 24 hours.

The compounds were also tested against Southern Army Worm (class Lepidoptera), other insects of aphid (Order—Homoplera), other members of the Coleopterous order, such as confused flour beetle and spider beetle, and against resistant mites and were found to be active. The results of the insecticidal evaluations are given in Table II.

TABLE II.—INSECTICIDAL ACTIVITY OF HYDANTOIN-3-AND -1-ACYL PHOSPHORIC ACID ESTER DERIVATIVES

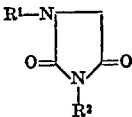

| | Mortality (percent) at 250 p.p.m. | | | | | | | |
|---|---|---|---|---|---|---|---|---|
| | | Mites [2] | | | | Bean aphids | | |
| | | Contact | | Systemic | | | | |
| Compound | MBB [1] | Adults | Nymphs | Adults | Nymphs | Contact | Systemic | Corn rootworm [3] |
| $R^1=CH_3$ $R^2=COCH_2SP(OC_2H_5)_2$ $\parallel$ $O$ | 100 | 90 | 80 | 90 | 100 | 80 | 80 | 0 |
| $R^1=CH_3$ $R^2=COCH_2SP(OCH_3)_2$ $\parallel$ $O$ | 100 | 100 | 90 | 100 | 100 | 90 | 90 | 80 |
| $R^1=CH_3$ $R^2=COCH_2SP(OC_2H_5)_2$ $\parallel$ $S$ | 0 | 100 | 90 | 100 | 100 | 0 | 20 | 0 |
| $R^1=CH_3$ $R^2=COCH_2SP$ $S(nC_3H_7)$ / $\parallel$ $\backslash OC_2H_5$ $O$ | 0 | 0 | 0 | 0 | 0 | 0 | 0 | 0 |
| $R^1=COCH_2SP(OC_2H_5)_2$ $\parallel$ $S$ $R^2=CH(CH_3)_2$ | 100 | 100 | 100 | 10 | 0 | 10 | 40 | 60 |
| $R^1=COCH_2SP(OC_2H_5)_2$ $R^2=CH(CH_3)_2$ | 100 | 0 | 0 | 0 | 0 | 0 | 0 | 80 |

[1] MBB=Mexican bean beetle.
[2] Mites=2 spotted spider mites.
[3] Corn rootworm run at 2.5 p.p.m.

What is claimed is:
1. A compound of the formula

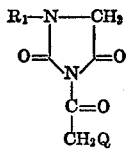

wherein $R_1$ is alkyl of from 1 to 6 carbon atoms optionally substituted by methoxy, allyl or dichlorophenyl; and Q is chlorine or bromine.

2. A compound according to claim 1, 3-chloroacetyl-1-methyl hydantoin.

3. A compound according to claim 1, 1-t-butyl-3-chloroacetyl-hydantoin.

4. A compound according to claim 1, 1-allyl-3-chloroacetyl-hydantoin.

5. A compound according to claim 1, 3-chloroacetyl-1-β-methoxyethyl-hydantoin.

6. A compound according to claim 1, 3-chloroacetyl-1-(2,4-dichlorophenyl) hydantoin.

References Cited
UNITED STATES PATENTS

| 3,406,179 | 10/1968 | Jamison | 260—309.7 |
| 3,687,966 | 8/1972 | Haubein | 260—309.5 |

FOREIGN PATENTS

| 6900039 | 7/1969 | Netherlands | 260—309.5 |

OTHER REFERENCES

Brown et al.: Chem. Abst., vol. 53, column 12894 (1959).

Nakamura et al.: Chem. Abst., vol. 63, columns 16973–74 (1965).

Takamatsu et al.: Chem. Abst., vol. 62, column 7768 (1965).

Umemoto: Chem. Abst., vol. 61, column 8296 (1964).

NATALIE TROUSOF, Primary Examiner

U.S. Cl. X.R.
71—92; 424—200, 273